United States Patent [19]
Cooper

[11] Patent Number: 5,307,402
[45] Date of Patent: * Apr. 26, 1994

[54] REDUCED TIME REMOTE ACCESS METHOD

[75] Inventor: Christophe K. Cooper, Kingwood, Tex.

[73] Assignee: Exxon Research and Engineering Company, Houston, Tex.

[ * ] Notice: The portion of the term of this patent subsequent to Sep. 1, 2009 has been disclaimed.

[21] Appl. No.: 860,497

[22] Filed: Apr. 16, 1992

Related U.S. Application Data

[63] Continuation-in-part of Ser. No. 615,931, Nov. 19, 1990, Pat. No. 5,144,651.

[51] Int. Cl.$^5$ ............................................. H04M 11/00
[52] U.S. Cl. ..................................... 379/98; 379/216; 375/8
[58] Field of Search ............... 379/216, 91, 93, 95-98, 379/106, 107, 144; 375/8, 9, 121, 13; 902/22, 25; 235/380, 382

[56] References Cited

U.S. PATENT DOCUMENTS

| | | | |
|---|---|---|---|
| 3,783,194 | 6/1974 | Vilips et al. | 375/8 |
| 4,606,044 | 8/1986 | Kudo | 375/13 |
| 4,669,090 | 5/1987 | Betts et al. | 375/8 |
| 4,796,292 | 1/1989 | Thomas | 379/91 |
| 4,894,847 | 1/1990 | Tjahjadi et al. | 375/8 |
| 4,939,767 | 7/1990 | Saito et al. | 379/100 |
| 5,025,469 | 6/1991 | Bingham | 379/98 |
| 5,144,651 | 9/1992 | Cooper | 379/98 |

FOREIGN PATENT DOCUMENTS 0380160  8/1990  European Pat. Off. ............ 379/216

OTHER PUBLICATIONS

Tanzilla, K., "Six Second Verification," *Communication News*, Jun., 1990, p. 49.

*Primary Examiner*—Wing F. Chan
*Attorney, Agent, or Firm*—Pravel, Hewitt, Kimball & Krieger

[57] ABSTRACT

Several techniques for reducing the amount of time between initiation of a terminal request through a dial-up telephone line and the actual initiation of transactions between the terminal and a host computer. By using a ring down or hotline circuit configuration dialing and call setup time can be saved. By using cut through techniques to gain direct access to the IXC switch, time can also be saved over conventional techniques. With the ring down use or cut through procedures no login procedure is necessary to ensure secure access to the host computer. The ring generation period is shortened to just an interval sufficient to allow the host modem to recognize the ring, with the ring indication period also begin shortened. The modems can be set to fixed baud rates, but in a more preferred embodiment the terminal modem transmits the originate carrier prior to the host modem picking up the line. The host modem then senses the originate carrier quickly and provides the proper answer carrier. If an originate carrier of an improper baud rate is provided, speed negotiation commences immediately. If no originate carrier is provided within a given time, a fall back to conventional techniques is used. The silent interval prior to operation of the host modem is removed. After the carriers are both provided, normal connection to the host computer is made and the transaction completed.

7 Claims, 8 Drawing Sheets

REDUCED TIME REMOTE ACCESS METHOD

This application is a continuation-in-part of application Ser. No. 615,931 filed Nov. 19, 1990, issued as Pat. No. 5,144,651 on Sep. 1, 1992.

BACKGROUND OF THE INVENTION

1. Field of the Invention

The invention relates generally to communication techniques used between a remote terminal and a host system, and more particularly to ways of reducing the time from initiation of the communication sequence by the terminal to commencement of transaction processing between the terminal and the host.

2. Description of the Related Art

With the advent of microprocessors and advances in telephone system, it has become possible to have many remote terminals call central hosts to access data. One of the common uses for this data access is credit card authorization. When a customer at a remote site wishes to make a credit card purchase, authorization must be obtained to determine if the transaction should be completed and credit extended. The process is initiated by passing the credit card through a magnetic card reader in a terminal or entering the credit card information manually into the terminal. The terminal then proceeds to connect itself through a telephone network to the host system. After the telephone connection is established and the modems establish a communication link, the host system is queried to determine if the transaction should occur and, if so, an acknowledgment is returned to the terminal and the transaction is completed at the remote location.

A problem arises regarding the length of time required for the terminal to access the host in combination with the cost of the telephone or other lines necessary to perform the connection of the modems. If conventional dial-up and modem technology is used, an average time to complete the connection, establish communications and initiate the transaction is on the order of 30 seconds. This has generally been deemed unacceptable in that the consumer at the remote location must wait this time and then a relatively short transaction time before the purchase can be completed. A conventional dial-up line is a relatively inexpensive connection and so of great interest to those parties which must maintain hundreds of these remote locations, but the performance drawbacks have been considered unsatisfactory.

One conventional way to resolve this connection and communication time problem has been the use of a multi-drop leased line. In this environment a number of remote locations are connected to a single leased line. A master modem at a host location sequentially polls the modems in the terminals at the various remote locations to see if they have data to transmit. If they do, communication is established between the two modems and data is transmitted to perform the transaction. While the performance is quite acceptable at approximately 5 to 7 seconds per complete transaction, the cost is in the range of eight times greater than dial-up technology. However, the added cost has been borne by the vendors because the conventional dial-up technology connection time has been unacceptable and no other generally acceptable solutions were available.

A revolution is currently in progress in the telephone communications area with the advent of digital processing and the use of digital computers in switching operations. Large long distance networks operated by interexchange carriers (IXC's) and to some extent local exchange carriers (LEC's) are adopting complete digital systems which correspond in varying degrees to the CCITT ISDN standards, the proprietary signalling portion of which is referred to as SS7, or Signaling System 7. These systems, and the various protocols and capabilities of such a system, are known to those skilled in the art. These standards and equipment and the various computer systems which operate them have allowed significant advances in the capability and features which can be supported.

One exemplary feature which has been improved is called a ring down or hot line technique. In a ring down system, the handset of a telephone is lifted, the telephone thus going off-hook, a signalling arrangement detects the off-hook condition and causes a predetermined telephone at a remote location to ring. No dialing is necessary. Conventionally this was done only for short distances using a dedicated line. This technique allowed quick connections but was quite expensive and effectively limited to point-to-point connections in local areas. The possibilities of ring down or hotline circuits have increased greatly with the new SS7 based signalling technology. One exemplary provider of this new service is Sprint, which provides the "VPN Hotline" service. The VPN Hotline service allows more flexibility than the conventional ring down circuit. Preferably, for best performance a direct access line (DAL) is provided from the customer site to a carrier point of presence (POP) at each end, with all switching between the two POP's being handled over the IXC's conventional shared switch network. The insertion of the POP's and the shared switch network allow the connection to be made between any two locations, assuming the locations are connected to the equipment which works according to the new protocol. The system performs basically as follows. The process commences when the caller goes off-hook to initiate a call. This off-hook condition is detected by the signalling equipment in the POP, with the computer system in the shared switch network thus knowing the effective address or identification of the caller. Because of the DAL connection, the caller is considered "on net," that is, positively identified by the shared switch network. An address or identification lookup from a computer database is then performed to determine where the call is to be placed. The final destination address or identification is provided by the lookup, with this information being passed through the Signaling System 7 compatible or similar network. The network passes the connection information to the receiving POP and the receiving telephone is made to ring. This VPN Hotline service provides quick access because no actual dialing is done and the LEC switching arrangement is by passed. Instead, the computer system senses via a conventional signalling arrangement that the originator has gone off-hook, performs a table lookup and then initiates the connection process to the answering or receiving telephone. Thus the use of the available advanced technology has allowed the hotline or ring down circuit to be extended across long distances.

One disadvantage of this VPN Hotline System is that it can only be programmed, at present, for a single point to point connection, but this is not a problem in the remote location to a central host for a credit card approval situation. The location of the host is fixed, therefore the lack of outgoing call location flexibility is not a problem. The originating location retains a unique identification, such as a phone number, so the remote location may still receive a call using conventional techniques. The use of the VPN Hotline technique alone allows a savings of approximately 15 seconds over conventional dial-up systems. Where the various portions of time are gained will be explained in detail later. However, if the conventional average time for dial-up line is approximately 30 seconds, as has been determined the various experiments, this reduction of approximately fifteen seconds still leaves approximately 15 seconds total connection establishment time. This is still relatively high and any further reduction is, of course, desirable.

Sprint has developed a more flexible alternative to the VPN Hotline service discussed above. The new service is referred to as "Switched Access VPN." In this service the customer dials the carrier equal access code and an end of dialing code to establish a cut through access to the carrier's network, for example 10333# in the case of Sprint. In the current majority of cases where the Sprint SS7 network is not fully interoperable with the LEC, this dial sequence causes the customer's telephone number to be forwarded to the carrier's POP by an MF signalling sequence which includes as a significant element the automatic number identification (ANI) sequence. The POP performs an identification lookup based on the telephone number to determine which features are available for this user. This lookup determines if the Switched Access VPN feature is available, and if so, which type. If the Switched Access VPN feature is available, the customer is now cleared and now is considered on net. Until the ANI lookup clears the customer, the customer is considered "off net," that is, unidentified and not secure. Two types of Switched Access VPN are available. In the first, referred to as immediate, only a single destination is available. In that case the POP has retrieved the destination address as part of the lookup and simply provides the destination address through the remainder of the network to establish the connection. In the second type of Switched Access VPN, referred to as delayed, numerous destinations can be accessed. If the POP determines that the second type is set up for this particular calling location, then the POP provides a dial tone to the customer, the customer then provides a destination number, which is the full digit destination on net number, and end of dialing code to the POP. The on net number is the number used internally by the IXC's network. When the POP receives the on net number, preferably a seven digit number, it retrieves a table for that destination number and does a validation lookup to determine if the particular customer is authorized by checking for the ANI information. If not listed, the customer is not authorized and a failure code in the form of a recorded announcement is returned. If listed and thus authorized, the call proceeds. Alternatively, fewer digits can be used in a speed dial arrangement, but the resulting speed dial lookup offsets the dialing of the extra digits. The destination address or identification based on the on net number is used and provided through the network to establish the connection. While some additional time is necessary because of the dialing of the digits, this service provides capabilities to reach multiple destinations.

The previous section described a service referred to herein as MF Switched Access VPN which is used when the POP and the LEC are not fully interoperable using SS7. In certain areas today and more areas in the future, the POP and the LEC are fully interoperable. In these cases the Switched Access VPN sequence is slightly different. After the customer completes the cut through request, the POP and LEC communicate out of band according to the SS7 protocol. Included in this communication is the automatic number identification of the customer. The POP then proceeds as stated above. The interoperable Switched Access VPN service is significantly quicker than the MF Switched Access VPN service because the use of the SS7 out of band signalling greatly reduces the time necessary to transmit the ANI and other signalling information as compared to MF signalling.

As compared to VPN Hotline, delayed MF Switched Access VPN may add as much as 2 seconds in the average case and immediate interoperable Switched Access VPN may be 1 second faster. Delayed, interoperable Switched Access VPN and immediate MF Switch Access VPN will add times between those limits. One advantage of all the Switched Access variations is that connection to the LEC is simplified. Where the original VPN Hotline connections generally required loop start connection to the LEC, the Switched Access variations utilize conventional 1FB or 1MB business line switched connections. The DALs and loop start are no longer required. Thus a small trade off in time greatly simplifies the actual ordering, wiring and provisioning of the system.

SUMMARY OF THE INVENTION

The present invention includes techniques for further reducing the total connection time from time of initiation by a remote terminal to commencement of the actual transaction. Several different options are used to reap varying levels of reduction in the total period. One of the techniques used to reduce the total time interval is the removal of any password or login procedure to the host computer. Because the VPN Hotline, Switched Access VPN, or similar techniques utilize database information contained in the IXC's computer system, the host computer does not actually have a telephone number per se and thus cannot be called using conventional dial-up techniques. Accordingly, it is not possible for the host to receive calls from any location other than those programmed into the databases in the various computer systems in the switching network. Thus, the network is secure, assuming integrity of the databases, and no login procedure is considered necessary. This results in the savings of approximately six-tenths of a second in an exemplary case.

Further time can be saved by setting the modems at the remote terminal and host to operate at a fixed baud rate and not do a selective baud rate handshake determination. By fixing the modems to bypass this baud rate handshake, approximately 2.2 seconds can be saved to further reduce the overall time. However, this technique does have certain disadvantages in that if terminals of differing baud rates are connecting to the host, then either a greater number of modems must be supplied or the chance of receiving a busy signal is increased. One alternative increases cost while the other increases average connection time. These alternatives may be acceptable in given cases and the embodiment may then be preferred in some cases.

A more preferred alternative to further reduce the connection time is to have the remote terminal modem automatically transmit the originate carrier instead of conventionally waiting to receive an answering tone from the host modem and recognize it before transmitting an originate carrier. The modem at the host is converted to expect receipt of an originate carrier and if so received, automatically transmits an appropriate answer carrier, if the modem can operate at the rate indicated by the originate carrier. Thus, using this technique the entire handshake interval can be completed in one-half second if no speed matching is required. If the host modem can not operate at the rate initially indicated by the terminals modem's originate carrier, the host modem commences negotiation of a baud rate by responding with a carrier according to conventional handshake and speed negotiation techniques, still having effectively bypassed several steps in the negotiation. If the host modem does not receive the originate carrier signal within a given time period, it can then default to conventional answer tone provision and full handshaking and speed arbitration. Thus, multiple speed modems of both conventional and originate carrier types can be used to access the host.

Yet another area to further reduce the connection time is by reducing the ring interval. The ring signal need be present only for a sufficient time to be detected the host modem. An additional 1.5 seconds can be saved with this short ring arrangement. With some signalling arrangements, such as E & M signalling which is preferably used in the Switched Access VPN embodiments, the ringing interval can be effectively eliminated in its entirety, resulting in a full 2 second savings.

An additional area to further reduce the total time is the removal of a silent interval after a ring indication is received by the host modem. The originate modem would preferably be providing the originate carrier from a period shortly after a loop is seized and before the telephone connection is completed. After the host modem has sensed the ring signal and picked up the line, the host modem senses this presence of the originate carrier and begins transmitting the answer carrier, assuming it was a proper speed. In the Switched Access VPN techniques, the originate modem would begin providing the originate carrier after the last digits in the sequence are dialed, so that again the originate carrier is provided before the telephone connection is completed and the host modem answers, so that the host modem can quickly sense this condition and immediately begin transmitting an answer carrier, again assuming the originate carrier was of a proper speed. Omitting any silent interval allows a savings of approximately 2.4 seconds.

Additionally, the terminal modem preferably senses dial tone very quickly, such as in 100 ms, and tone dials very rapidly, preferably only 100 ms per digit. These operations also allow time savings.

By using all of these techniques in conjunction with the VPN Hotline service or its equivalent, it is possible to reduce the overall time by a great deal, to an exemplary 5.7 seconds in given examples, from approximately 30 seconds in a conventional dial-up arrangement. Utilizing the delayed, MF Switched Access VPN service allows the reduction to an exemplary 7.8 seconds in given examples, while utilizing the immediate, interoperable Switched Access VPN service allow a reduction to an exemplary 4.6 seconds. It is, of course, noted that these times are exemplary and will vary by location but the general concept will produce equivalent results in each given instance. Thus, by the combination of these various events, the transaction time can be reduced as desired. It can be reduced first by several simple steps and still use conventional modems. If greater time savings are desired, new modems with revised handshaking and silent interval alternatives can be used with the time being dramatically reduced. Thus the invention allows dial-up type switched access with its much cheaper cost to be used instead of the more expensive leased line options with sufficient performance to reduce consumer impatience.

BRIEF DESCRIPTION OF THE DRAWINGS

A better understanding of the present invention can be obtained when the following detailed description of the preferred embodiment is considered in conjunction with the following drawings, in which.

These figures are not intended to define or limit the invention, but are provided solely for the purpose of illustrating preferred embodiments of the invention.

DETAILED DESCRIPTION OF THE PREFERRED EMBODIMENT

Figure 1:
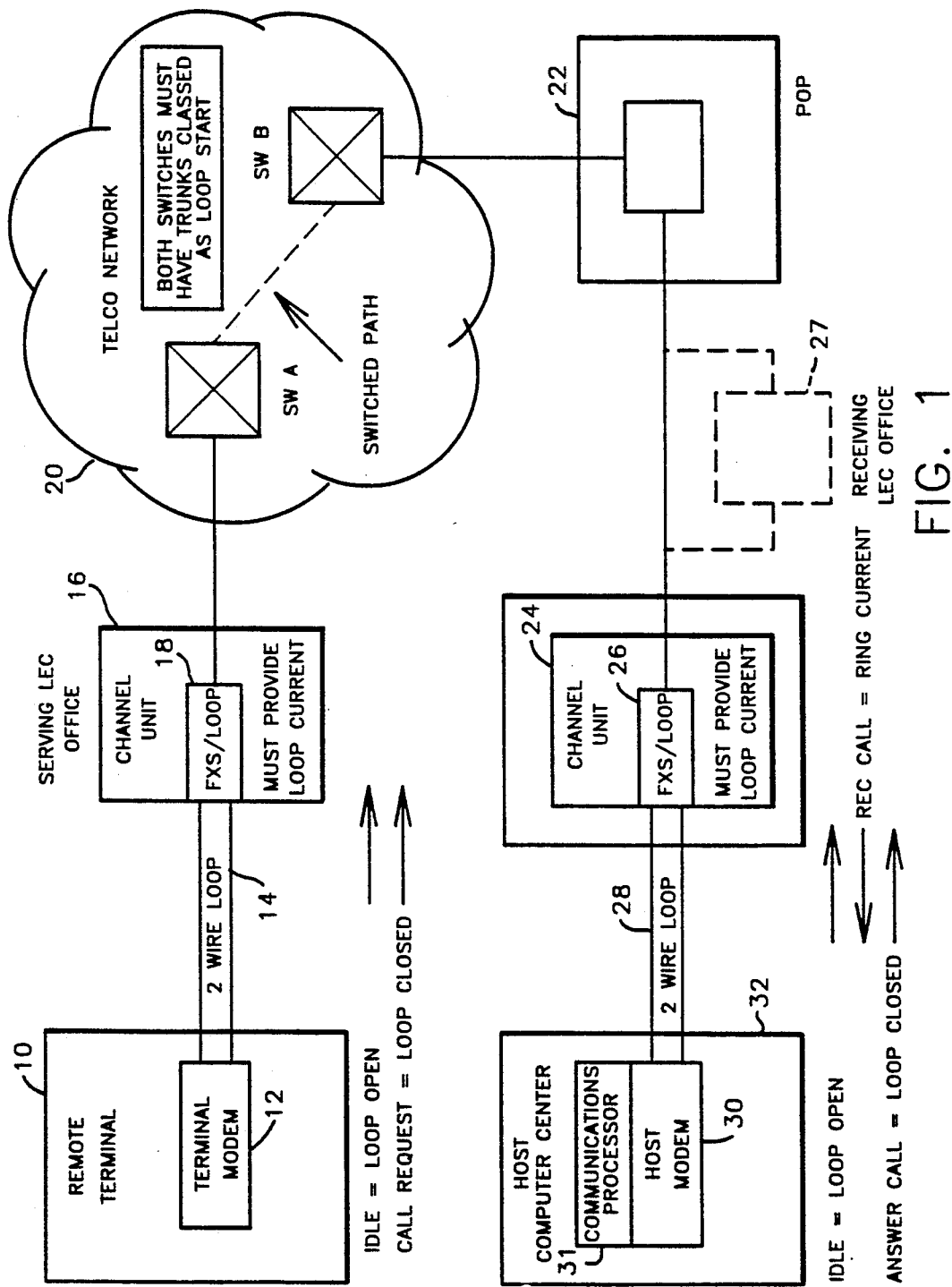
FIG. 1 is a block diagram of the telephone system according to the present invention using the VPN Hotline service.

FIG. 1 discloses an end to end circuit configuration of a telephone system incorporating a preferred embodiment of the present invention. A remote terminal 10 includes a terminal modem 12. In the preferred embodiment terminal modem 12 is a 1200 baud modem that operates according to the Bell 212A sequence, or alternatively the V.22 bis, V.32, V.32 bis or other sequences. 1200 baud operation is preferred because speed negotiation or handshaking with the 1200 baud Bell 212A specification takes less time than handshaking with the V.22 bis specification. For example, use of a V.22 bis handshaking sequence and operation at 2400 baud sends the characters at twice the speed, but the slower V.22 bis handshaking time actually increases the total time from starting communication to completion of most short messages. Thus the added cost of the conventional 2400 baud modem is not offset by a reduction in total time of interest. However, the technique will operate with any baud rates, commonly up to 56 kbaud, and operation at these higher baud rates may be desirable for longer messages or transactions.

The terminal modem 12 can be dedicated to the telephone line or may share it with other units and can be any type device that can seize a telephone line to indicate an off-hook condition. The terminal modem 12 is connected to the serving local exchange carrier (LEC) office through a two wire loop 14. In the preferred embodiment for use with the VPN Hotline service or its equivalent, this two-wire loop 14 is a private leased line also known as a direct access line (DAL). The terminal modem 12 is connected to the serving local exchange carrier (LEC) office through a conventional two-wire loop 14. The two wire loop 14 is connected to a channel unit 16 in the serving LEC office. The channel unit 16 includes the proper foreign exchange subscriber (FXS) equipment 18 for connection to the two wire loop 14. The FXS equipment 18 is configured to provide loop current and may detect closure based on loop start. Loop start is such that when the terminal modem 12 requests a line by going off hook, the loop is closed and current begins to flow through the two wire loop 14. The FXS equipment 18, or alternatively the point of presence (POP) equipment, senses this current flow in the loop and thus recognizes that the terminal modem 12 is requesting a data transmission or is acknowledging a ring indication.

The serving LEC office channel unit 16 is connected to a switch SWA in the telephone company shared switch network 20. This connects the channel unit 16 to the telephone company network 20, which then can transfer the information to a host unit 32. The switch SWA senses that the line is being requested. The switch SWA performs the proper look-up and then according to the VPN Hotline or similar techniques communicates to a switch SWB in the IXC telephone company network 20 which is located near the host unit 32. Switch SWB communicates to a point of presence unit (POP) 22 of the preferred carrier of the user. The POP 22 in the preferred embodiment is directly connected to the host channel unit 24, preferably by a T1 link, but alternatively can be connected through a receiving LEC office 27. The disadvantage of having the connection made through a receiving LEC office 27 is that it may add approximately 5 seconds to the total transaction time, but this technique may be required depending on the number of connections in the host unit 32. If the number is low then the added expense of the direct connection to the POP 22 may not be justified. It is noted that connection through to a POP may be necessary if the LEC equipment is not able to operate according to the necessary protocols. It is further noted that a POP may be included in the circuit between the serving LEC and the telephone network 20 for similar reasons. The receiving channel unit 24 is configured in a similar manner to the serving channel unit 16 in that it has FXS loop equipment 26 which provides loop current to a two wire loop 28, which is in turn connected to a host modem 30 coupled to the host unit 32 through a communications processor 31. The communications processor 31 is used to convert the asynchronous serial signals used by the host modem 30 into synchronized digital signals used by the host unit 32. In the preferred embodiment the communications processors 31 handles the flow of transactions to the POS terminal in accordance with the VISA I or equivalent protocol and to the host in accordance with the X.25 protocol. When the host modem 30 senses the ring indication, it closes the loop by going off-hook and the current begins to flow at the receive end.

Thus, operation in this circuit of FIG. 1 proceeds as follows for a VPN Hotline service or its equivalent. A remote terminal 10 is activated and the terminal modem 12 goes off-hook and draws loop current. This loop current draw is sensed by the channel unit 16 and switch SWA. Switch SWA performs the data lookup to determine the routing information for a call being placed by the terminal modem 12 and transfers the call and routing information through to switch SWB according to the SS7 protocol. Switch SWB connects to the POP 22 based on the signalling information provided by switch SWA. The POP 22 routes the call to the channel unit 24, which through the FXS loop equipment 26 and over the two wire loop 28, and provides a signal to the host modem 30 that a call is being received. The host modem 30 senses this ring indication and closes the loop, thus establishing a complete circuit between the terminal modem 12 and the host modem 30. Any modem speed negotiation and login procedures necessary to the connection process and the actual transaction can then occur.

It is noted that preferably the serving LEC office contains SS7 or ISDN compatible equipment which is interoperable with SS7 compatible equipment of the IXC so that a direct connection is not necessary to a POP which could exist between the serving LEC office and switch SWA. This is a desirable condition to improve performance and save expense but, of course, depends upon the equipment being provided by the serving carrier and the interoperability of signalling systems between the IXC and the LEC.

Figure 2:
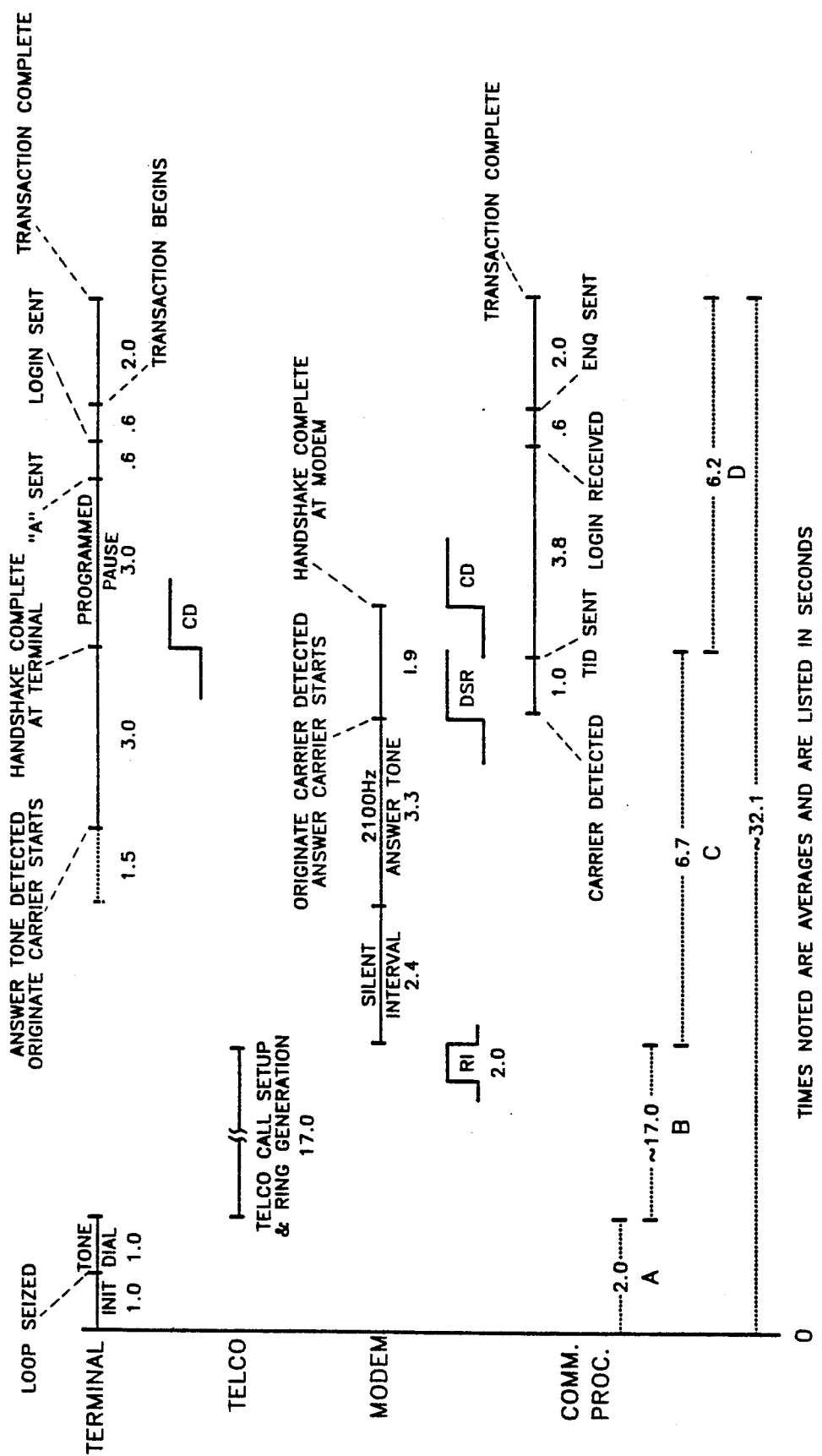
FIG. 2 is a timing diagram of a dial-up line according to the prior art.

To fully understand the operation and improvements provided by this invention, it is useful to describe and analyze a conventional connection developed using a standard dial-up line with its various timings. Please refer to FIG. 2 in connection with this description. It is noted that in all the timing diagrams any values given are considered to be approximate or average values, with the absolute value varying depending upon various efficiencies and speeds of the communications equipment installed. The illustrative values were developed in a series of experiments to develop some idea of the actual values involved. However, in all cases the actual protocol being developed will provide similar savings of time based on the actual times in a given circumstance.

The sequence in a conventional system begins at time zero with the remote terminal 10 formatting the user data into a transaction and sending a command to the terminal modem 12 to go off-hook. This interval lasts approximately 1.0 seconds, during which time the terminal modem 12, having initiated the call by going off-hook, checks the phone line to determine that a dial tone is present and returns a failure code if it is not present. For a period of approximately one second the terminal modem 12 tone dials the telephone number of the host modem 30 or modem pool. Thus the time required to initiate a call is approximately 2.0 seconds. The telephone company or telco system 20 receives this dialing information and proceeds through call setup and ring generation. This period was measured in a series of experiments to be approximately 17.0 seconds for that particular circuit path. This number of course will vary by location. The last two seconds of this period include the ring generation interval which is indicated by the presence of the RI or ring indication signal by the host modem 30.

After the host modem 30 recognizes that a ring signal is present by the removal of the RI signal, the call is answered by the host modem 30 going off hook. Modem negotiation begins with a 2.4 second silent interval. This silent interval for in band signalling associated with billing is presently mandated by the Federal Communications Commission. After the silent interval the host modem 30 provides a 2100 Hertz answer tone for a period of approximately 3.3 seconds. It is noted that the protocol being described is the V.22 bis protocol and is exemplary of a particular protocol, but it is noted that other protocols and handshaking schemes can be performed with similar events occurring. During this interval, at approximately 1.5 seconds after the start of the answer tone in the example, the answer tone is detected by the terminal modem 12, which then provides an originate carrier. The originate carrier is eventually detected by the host modem 30 and an answer carrier is then provided. At the time the 3.3 seconds of the 2100 Hz answer tone is completed, the host modem 30 raises a DSR or data set ready signal to indicate that the handshaking or negotiation sequence is commencing and provides an answer carrier. Approximately one second after the answer carrier is started, the host modem 30 concludes the handshake sequence and raises a CD or carrier detect signal to indicate a ready status. The terminal modem 12 will have previously raised its carrier detect signal when it completes its portion of the handshake sequence and recognizes the answer carrier. The remote terminal 10 goes into a programmed pause to allow various portions of the system to complete their operation prior to sending or transmitting data.

When the carrier detect signal of the host modem 30 goes to a high state, this is an indication to the communications processor 31 that carriers are present and data communication can commence. Approximately one second after the presence of the answer carrier is indicated, the communications processor 31 is conditioned to conduct data communications. In the specific units in the experimental sequence a TID or terminal identification request was ignored by the remote terminal 10 and this time built into the programmed pause. A timing character is transmitted by the remote terminal 10 after the completion of its programmed pause. The character transmitted is preferably a capital A because this allows convenient interval timing loops to be used to easily determine the baud rate of the transmitting terminal modem 12. This period from carriers present to completion of baud rate determination was approximately 3.0 seconds in the experiments. A period after the baud rate character is sent, the terminal modem 12 transmits the login information to allow the remote terminal 10 to log into the host computer 30. This login signal is received by the communications processor 31 and after approximately 0.6 seconds an ENQ or enquiry character is sent to the terminal modem 12 to indicate that login has been completed.

At this point the actual transaction for credit authorization or other purposes begins. In an exemplary credit transaction, this may take approximately 2.0 seconds, which includes the various addressing protocol packets and other information which are transmitted. Numerous transactions protocols or formats can be utilized, but in the preferred embodiment a variation on the VISA I protocol is used. After 2.0 seconds in the experiments the transaction is complete and the remote terminal 10 can begin completing the transaction at the remote location. Timing criticality stops at this point and thus is not described.

In a series of measured tests, this entire interval from remote terminal 10 initial request to end of transaction was approximately 32.0 seconds, an unacceptably long period for most consumer transactions. This total time can be broken down into four portions. Portion A begins when the remote terminal 10 local transaction is complete and the communication process is started. Portion A includes the time from the completion of the local transaction to completion of the dialing of the host phone number, including the time the remote terminal 10 requires to send a command to the terminal modem 12 causing the terminal modem 12 to go off-hook, the time the terminal modem 12 takes to determine if a dial tone is present and the time required to actually dial the number, including any pauses or special digits that may be required. Portion B represents the time required for the telephone company to route the call and complete the ringing cycle at the host location. This time begins following dialing of the last digit by the terminal modem 12 and ends when the call is answered following the ring. Portion C represents the time required for the host modem 30 to answer the call, negotiate a speed and indicate that the data can be sent by raising the CD signal. Thus Portion C begins when the host modem 30 answers the call and ends when intelligent data can be transmitted from the host modem 30 to the remote terminal 10. Portion D represents the remainder of time to completion of the transaction and includes the login process, transmission of an inquiry, communication of the actual transaction data from the remote terminal 10 to the host computer 32, any host processing time and communication of any response to the remote terminal 10. In the experiments that were performed, Portion A was approximately 2.0 seconds, Portion B was approximately 17.0 seconds, Portion C was approximately 6.7 seconds and Portion D was approximately 6.2 seconds. Because of rounding, these may not add up to the 32.0 second value for the entire period.

In a first series of additional experiments and tests, various parameters were changed from the conventional dial-up setup. The first change was the connection of the terminal through a VPN Hotline or ring down look-up type arrangement described in the description of FIG. 1. The second change was the setting of the host modem 30 and the terminal modem 12 at set baud rates to reduce large portions of the handshake period. A third change was the complete removal of the login sequence. An additional change was that auto baud rate determination was not made.

Figure 3:
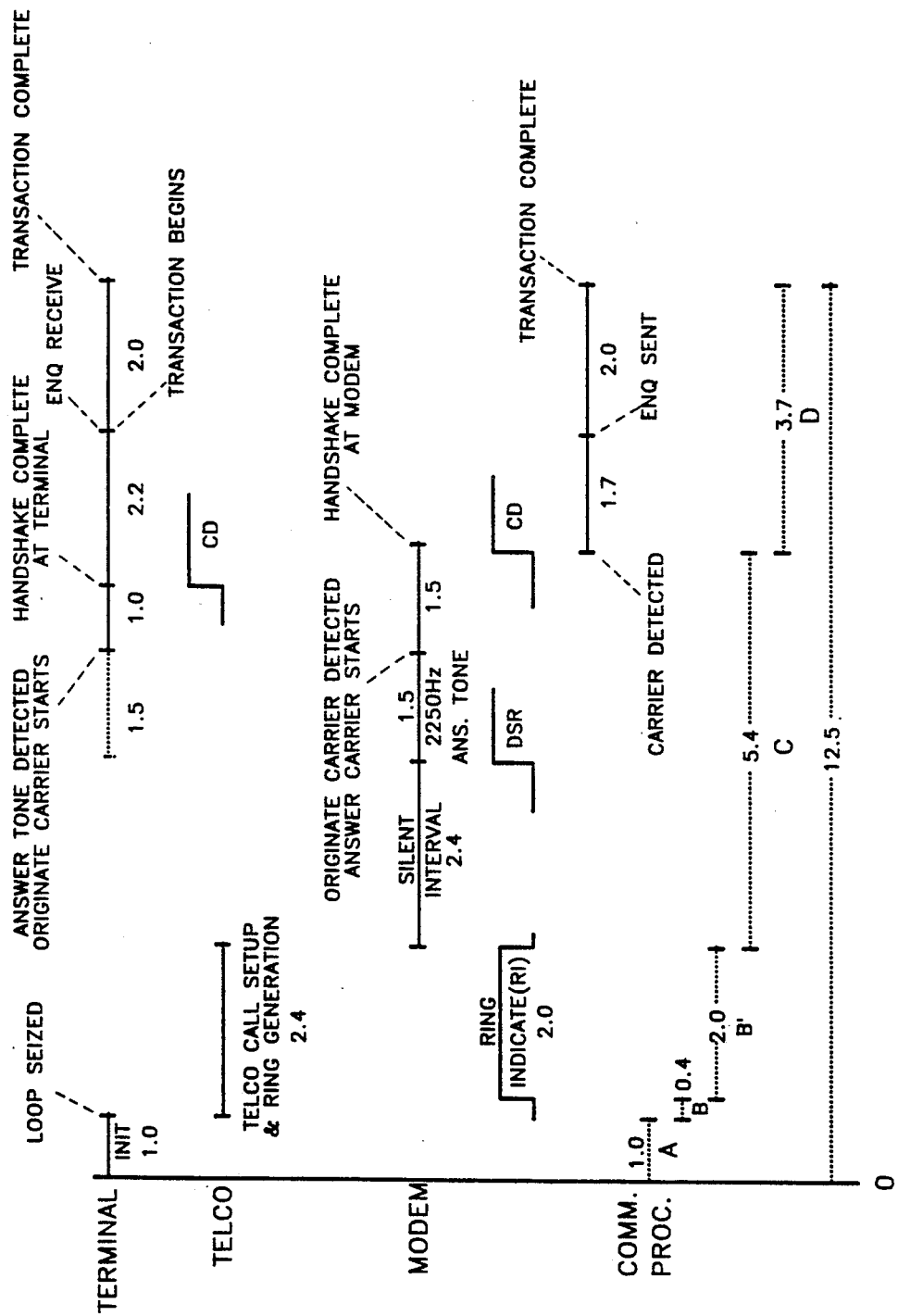
FIG. 3 is a timing diagram of the transaction sequence of one embodiment of the present invention using a particular modem convention and the VPN Hotline service.

A call sequence for a system including those changes is shown in FIG. 3, with operation as follows. Operation commences at time zero when the terminal requested a connection and the initiation period of one second commences. After this one second interval, the loop 14 is seized and current begins to flow. The channel unit 16 at the serving LEC office determines that the call is being placed and upon loop seizure initiates call setup and ring generation. In the experiments this period lasted approximately 2.4 seconds, 2 seconds of which was the ring indication period. The host modem 30 upon removal of the ring indication signal initiates the silent interval of 2.4 seconds. After the silent interval is completed, the DSR signal is raised and a 2250 Hz answer tone is provided for 1200 baud operation. In the sequence illustrated in FIG. 3 the modems 12 and 30 are operating according to the Bell 212A protocol and at a fixed baud rate, with the modem baud rate handshaking disabled. After approximately 1.5 seconds the answer tone is detected by the terminal modem 12, which proceeds to respond and provides the originate carrier. The originate carrier is quickly detected by the host modem 30 and the answer carrier provided. After approximately 1.5 seconds the host modem 30 concludes that the handshake is complete and the CD signal is raised. Again, the terminal modem 12 will have previously concluded that the handshake is completed and will have raised its CD signal. Upon the receipt of the CD or carrier detect signal from the host modem 30, the communications processor 31, which communicates with the terminal modem 12 according to the VISA I protocol, after approximately 1.7 seconds transmits the ENQ character to the terminal modem 12. The terminal modem 12 receives the ENQ character and the transaction immediately commences without a login procedure. Again, the transaction lasts approximately 2.0 seconds and completes.

It is noted that a login is not required because according to the operation of the telephone network 20, the host modem 30 does not actually have a number which is called but merely a designation or location contained in the switches SWA and SWB. Because the only access to this location can be through the switch information data base, it is not possible to call this number with a conventional dial-up unit and therefore, no security breach should occur unless the telephone company network 20 switch SWA is reprogrammed. Thus, the login procedure can be removed, saving approximately 0.6 seconds.

The total average time from terminal request to transaction complete was approximately 12.5 seconds in the series of experiments. This reduction from approximately 32.0 seconds was obtained in several ways. Approximately one second was saved by not requiring a number to be dialled and another approximately 14.6 seconds was saved in the call set-up and ring generation phase because of the ring down arrangement. By the use of the alternate modem protocol and the fixed baud rate operation, a period of approximately 3 seconds was saved by the shortened handshake period and the quicker switching of the communications processor 31. The login time of approximately 0.6 seconds was also saved just prior to commencing the transaction. The approximate times of the various portions equivalent to those of FIG. 2 were 1.0 second for Portion A, 2.4 seconds for Portion B, 5.4 seconds for Portion C and 3.7 seconds for Portion D.

Figure 4:
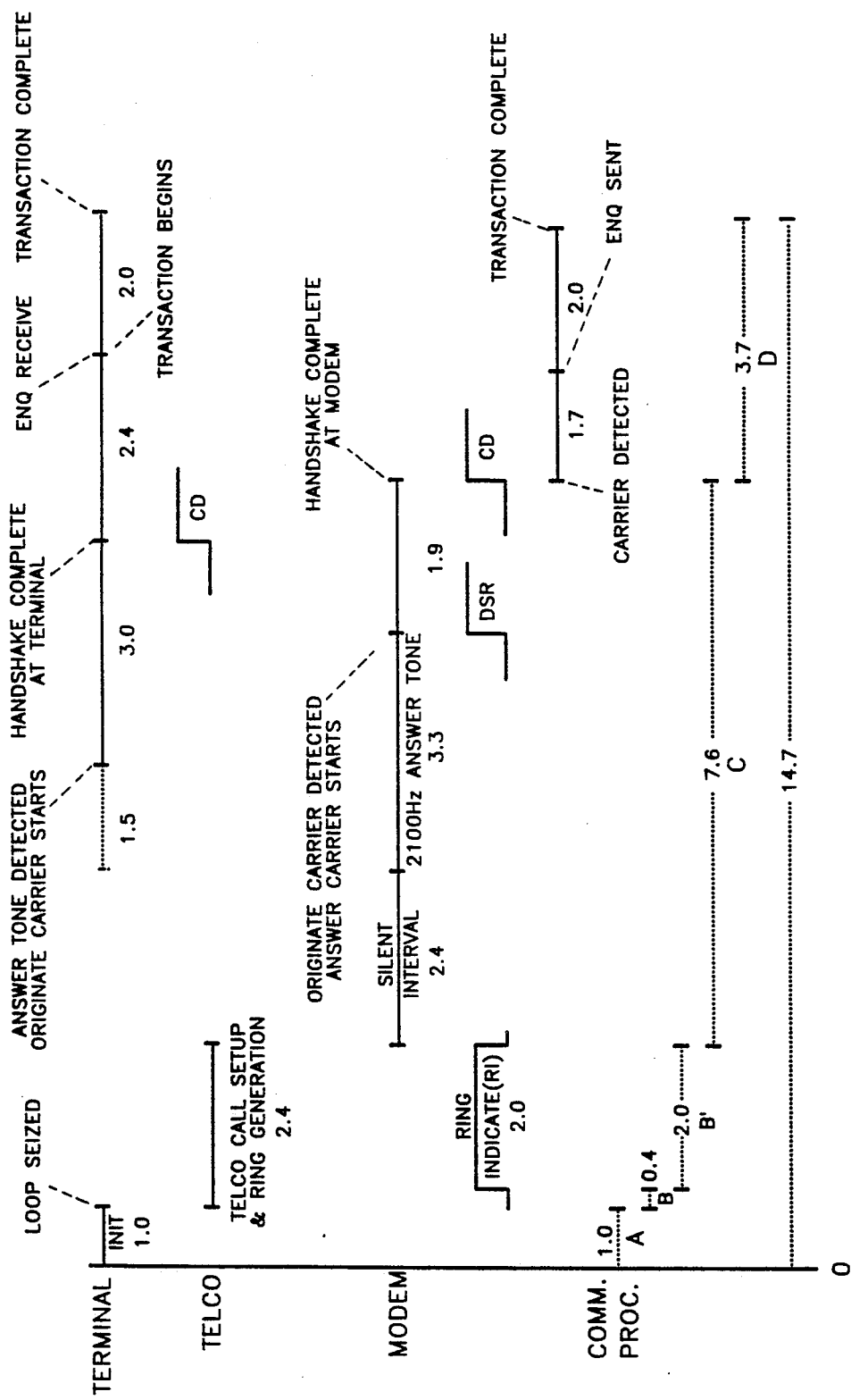
FIG. 4 is a timing diagram of the transaction sequence of FIG. 3 but utilizing a different modem convention.

FIG. 4 represents a variation of FIG. 3 with a different communication protocol between the two modems 12 and 30. In this case, the V.22 bis sequence is used instead of the Bell 212A protocol. The primary differences between FIG. 3 and FIG. 4 are shown in the period of the modem handshake, where the host modem 30 provides a 2100 Hz answer tone which is received by the host terminal 12. This tone is provided for a longer period of approximately 3.3 seconds. After detecting the answer tone, the terminal modem 12 provides an originate carrier. After this originate carrier is detected, an answer carrier is commenced by the host modem 30. After a period of time the handshake is fully complete and the host modem CD signal is raised and connection between the modem 30 and the host unit or computer 32 proceeds. Using the alternate standard of V.22 bis, the approximate total time is 14.7 seconds, with the change between FIG. 3 and FIG. 4 protocols occurring in Portion C relating to the modem handshaking and connection, which increased from 5.4 seconds to 7.6 seconds.

Figure 5:
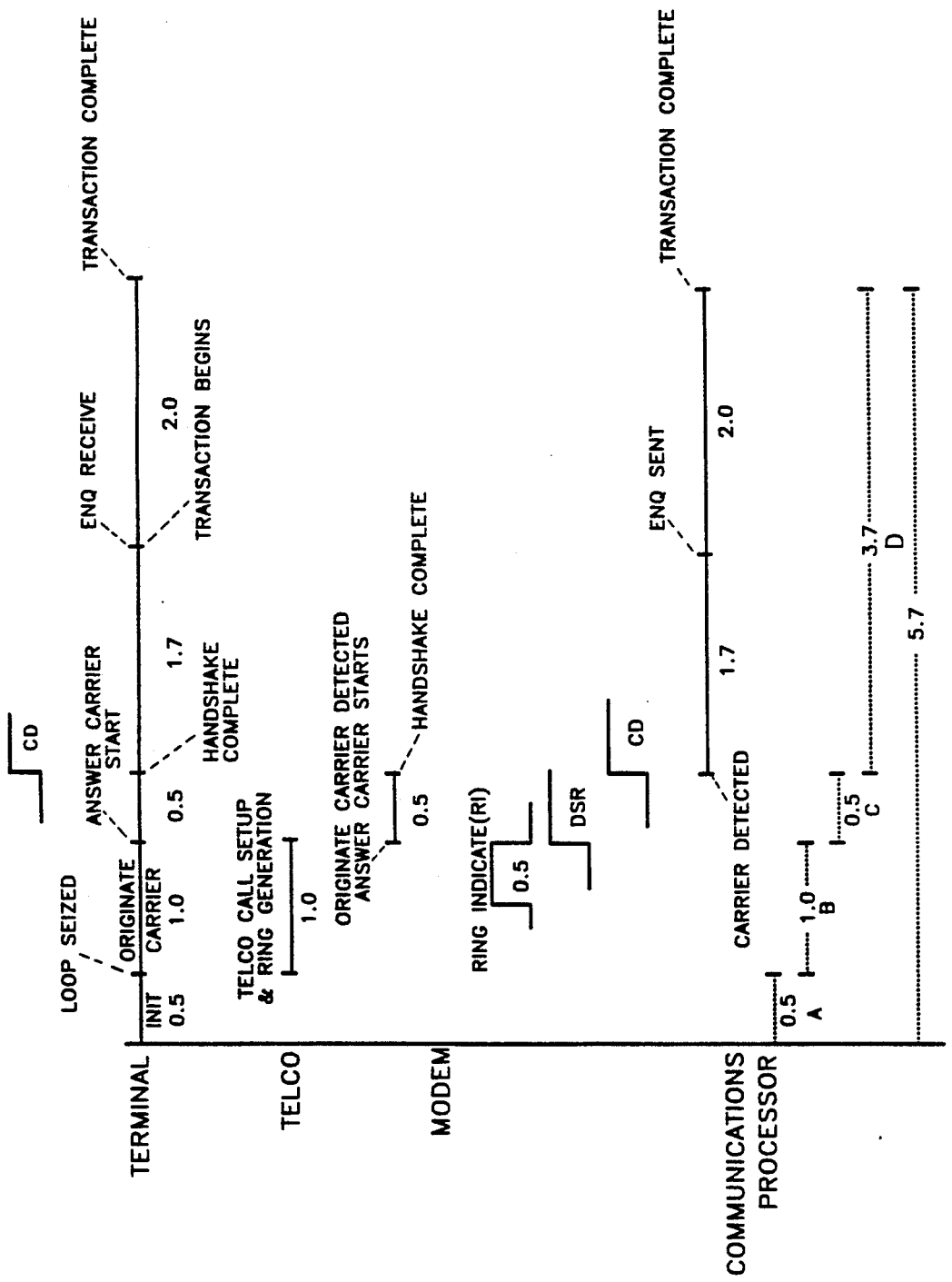
FIG. 5 is a timing diagram of the transaction sequence of an alternate embodiment using modified modems to reduce the connection times and the VPN Hotline service.

In FIG. 5 a further optimized timing sequence is shown. In the particular timing sequence the average time from terminal request to termination of transaction is approximately 5.7 seconds. This is developed as follows. A terminal request is initiated so that after a 0.5 second period the loop is seized. This period is (slightly reduced from the previous 1.0 second interval by optimizing remote terminal 10 operations. This optimization can be accomplished by simplifying the terminal modem 12 checking of the telephone line 14. In the ring down arrangement the majority of the factors that need to be checked are removed and so the line checking can be limited to simply monitoring for the presence of any tone and, if obtained, proceeding without further checking. This loop seizure indicates to the telephone company equipment that it should commence call setup and ring generation, which lasts 1.0 seconds. This interval is reduced by having the ring signal present only for a sufficient time to allow detection by the host modem 30 and then ceasing. The host modem 30 then provides the ring indicator or RI signal for 0.5 seconds. This is thus a 1.0 second interval instead of the previous 2.4 second interval. This 0.5 seconds of RI signal can be removed if E & M signalling is utilized, but this is not preferred in this embodiment because of other increased complexities. While in the conventional case the terminal modem 12 is inactive during the ring generation and indication period, in this embodiment the terminal modem 12 is preferably transmitting the originate carrier before the call setup and ring generation is complete, possibly continuously from the loop seizure. Upon removal of the ring indication signal the host modem 30 answers and immediately raises the DSR signal. The host modem 30 picks up the line without waiting for a silent interval. As the host modem 30 picks up the line it immediately detects the originate carrier which is already being provided by the terminal modem 12 and quickly provides the answer carrier to the terminal modem 12. The host modem 30 is preferably set to default to the desired frequency of the terminal modem 12, thus eliminating need for baud rate negotiation. After approximately 0.5 second the handshaking is considered fully completed and both carriers have been detected. The carrier detect signals are raised by both the terminal modem 12 and the host modem 30. This raising of the host modem 30 CD signal indicates to the communications processor 31 the need to begin the transmission to the host computer 32. After the same approximately 1.7 second interval, the ENQ character is sent by the host modem 30 and the transaction begins. The transaction lasts, for the sake of this description, the previously measured 2.0 seconds period and then completes. Thus, in this enhanced version, an additional approximately 7 seconds have been removed, with a portion coming from optimizing the terminal 10, a portion from reducing the ring generation interval, a portion coming from the removal of the silent interval and another major portion from the simplification of the handshake based on the terminal modem 12 providing the originate carrier early so that when the host modem 30 goes off-hook, the carrier is quickly detected and the answer carrier provided.

It is noted that in the embodiment of FIG. 5, the host modem 30 is set to have a default of the speed of the terminal modem 12. However, to facilitate switchover of a large system to modems utilizing the revised handshake procedure or the changeover of modems utilizing the revised handshake procedure to different baud rates, it is desirable to have the host modem 30, or modems in case of the typical modem pooling arrangement, respond to different baud rates or conventional handshake procedure modems which need an answer tone for their operation to connect to the host modem 30 and to varying originate carrier frequencies. This would simplify the changeover process as it may not be desirable or feasible to immediately replace all of the terminal modems 12 in a very short period of time. This multiple function operation may be developed in the host modem 30 as follows. Upon going off-hook the host modem 30 samples for the originate carrier on a selected frequency based on its default baud rate.

If an originate carrier is detected and the host modem 30 can operate at the baud rate indicated by the originate carrier, the host modem 30 provides the appropriate answer carrier. This is the preferred case and simplest, as only a relatively few host modems are necessary and they can be changed over easily and be more complex and yet not overly impact changeover costs as compared to changing the entire network in a short period. If an originate carrier is detected but the host modem 30 cannot operate at the indicated baud rate, the host modem 30 returns an answer carrier to perform a speed negotiation process. The two modems 12 and 30 then negotiate for an acceptable baud rate. Because the originate carrier has already been provided, the negotiation process is effectively started in mid-stream as compared to a conventional case which first requires an answer tone. So even the negotiation process is shorter.

Certain further options are available if modems using the V.32 or V.32 bis standards are used. For example, V.32 systems must also adjust adaptive equalization settings and other parameters. The host modem 30 can sample and store typical settings for its given network and circuits and attempt to use these stored settings before performing a full negotiation process for the settings.

If this originate carrier is not detected within a given period, for example, 0.3 second or 2.4 seconds to simulate a silent interval, the host modem 30 determines that a nonoptimized terminal modem 12 is being utilized in this communication sequence and reverts back to conventional modes such as Bell 212A, V.22 bis or V.32 to perform a full baud rate negotiation and handshake.

Analyzing then the times of the various portions, Portion A is reduced to approximately 0.5 seconds, Portion B reduces to approximately 1.0 seconds, Portion C is dramatically reduced to approximately 0.5 seconds, while Portion D remains at approximately 3.7 seconds.

Thus, it can be seen that through the use of several factors the reduction of the time using a dial-up line can be dramatically reduced from in excess of 30 seconds to a number just slightly greater than 5, while still maintaining dial-up costs.

Figure 6:
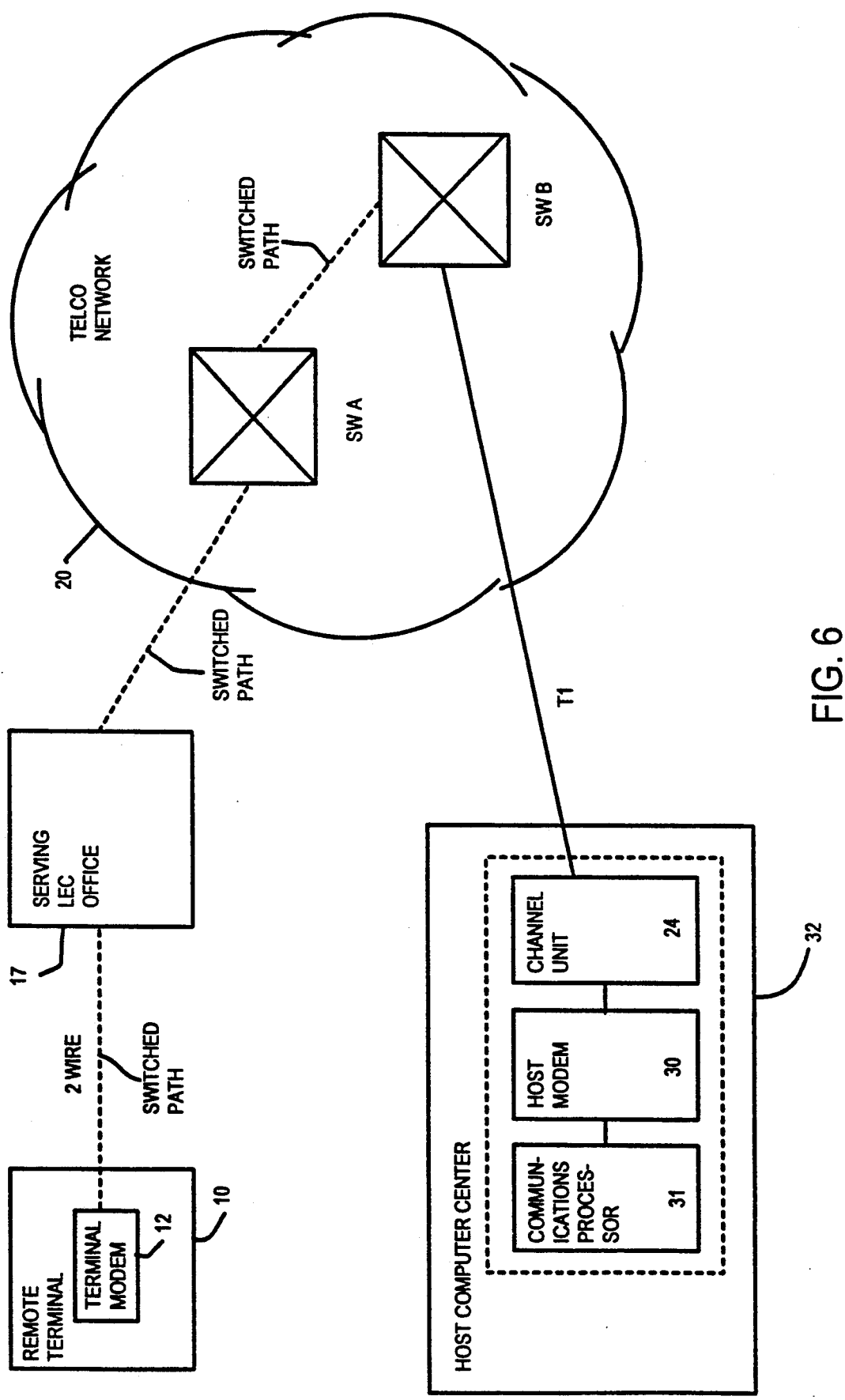
FIG. 6 is a block diagram of the telephone system according to the present invention using a Switched Access VPN service.

FIG. 6 illustrates a telephone system using the Switched Access VPN service or its equivalent. Again a remote terminal 10 includes a terminal modem 12 such as those previously described. However, in this embodiment the terminal modem 12 is connected to the LEC 17 via a conventional 1FB, 1MB or equivalent switched line, not the direct access line of the VPN Hotline embodiment. This use of the 1FB or 1MB line simplifies the actual ordering, wiring and provisioning of the connection to the LEC 17. The LEC 17 is connected to switch SWA in the telephone company network 20 by a conventional Feature Group D switched trunk, as used in all equal access calls. With this switched arrangement the LEC 17 could easily connect to any number of different telephone company networks which provide functions equivalent to the Switched Access VPN service of Sprint. The switch SWA in the IXC network 20 performs the look-up as discussed in the background and communicates the destination information to Switch SWB. In this preferred embodiment there preferably is a dedicated T1 link from switch SWB to the host computer center 32 and it's channel unit 24. This allows numerous calls to be handled simultaneously in a very efficient manner. Additionally, the channel unit 24 could receive T1 links from different telephone company networks. The channel unit 24 is connected to a series of host modems 30, which in turn are connected to the communication processor 31, as described above. In an alternate embodiment the channel unit 24, the modems 30 and the communication processor 31 could be combined on one unit, such as the system provided by Primary Access Corp. of San Diego, Calif. The Primary Access system preferably replaces the analog modems with digital signal processing (DSP) units, which perform the digital equivalent function of the analog modems, so that the entire channel from switch SWB can remain digital. The T1 link is preferably connected with either loop start signalling or E & M signalling. In either case, monitoring of the A and B signalling elements to detect ring allows almost total reduction of the ring sequence. The X.25 portion of the Primary Access system also speeds up the host connection process, effectively reducing host processing time.

Operation according to FIG. 6 proceeds as follows for a Switched Access VPN Service or its equivalent. A remote terminal 10 is activated and the terminal modem 12 goes off hook and quickly detects the dial tone. The terminal modem 12 then dials the access and cut through sequence, such as 10333#. Preferably the terminal modem 12 is configured to detect a dial tone within 100 ms and to rapidly tone dial the digits, with each digit and the space following each digit being provided for 50 ms each, for a tone dialed digit and its associated space preferably being provided for just 100 ms. It has been determined that most of the modem equipment utilized by LEC's and IXC's can readily handle these shortened times. In other cases the times can be extended. The LEC 17 communicates with switch SWA and transfers the automatic number identification information. The switch SWA performs the lookup as described and proceeds until the destination information is obtained. The destination information is passed to switch SWB according to the SS7 protocol. Switch SWB connects to the T1 link to the channel unit 24. The channel unit 24 provides a ring signal to the host modem 30, which detects the ring and goes off hook to complete the circuit to the terminal modem 12.

Figure 7:
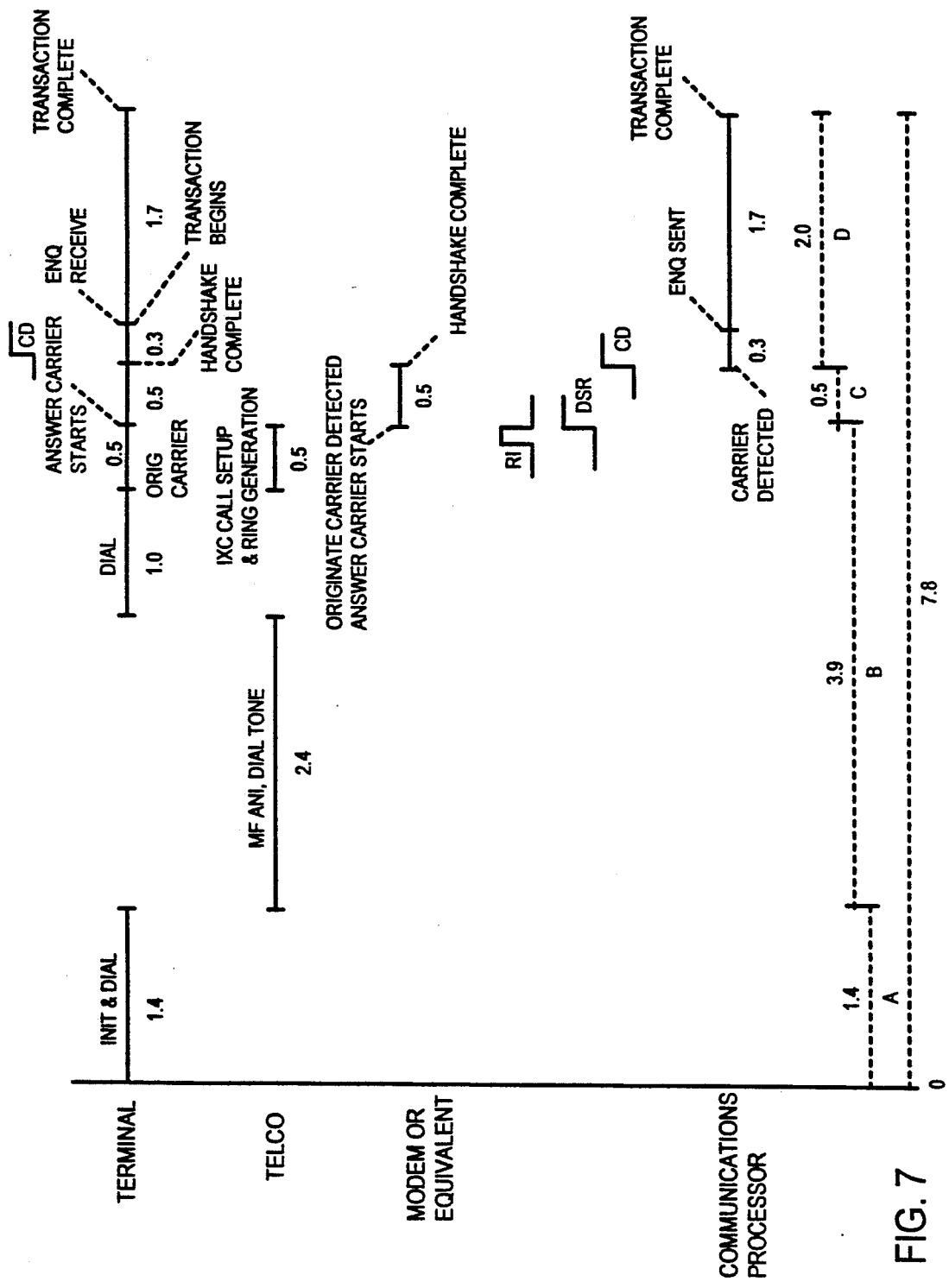
FIG. 7 is a timing diagram of the transaction sequence using the modified modems and the delayed, MF Switched Access VPN service.
Figure 8:
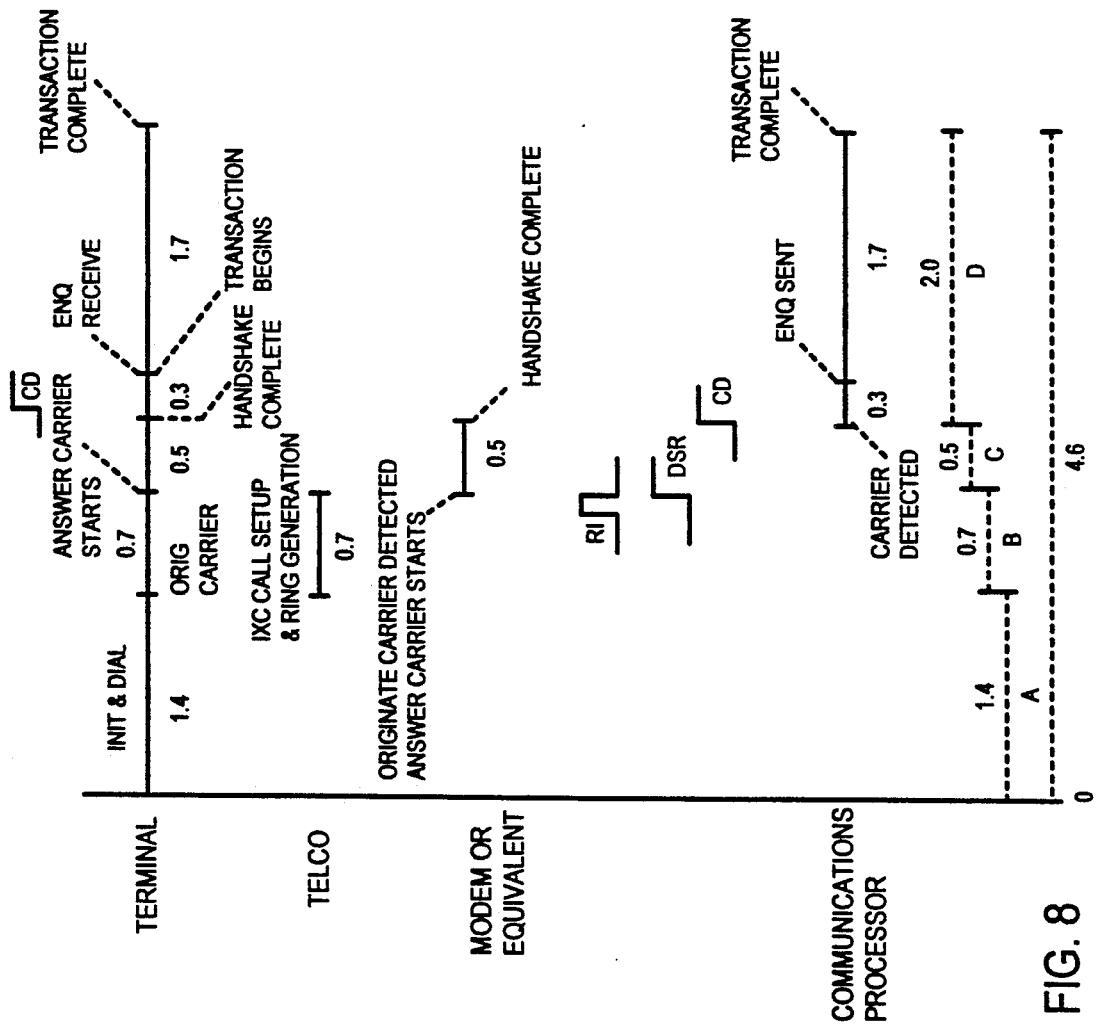
FIG. 8 is a timing diagram of the transaction sequence using the modified modems and the immediate, interoperable Switched Access VPN service.

FIGS. 7 and 8 illustrate timing sequences using the protocol of FIG. 5 combined with delayed, MF Switched Access VPN and immediate, interoperable Switched Access VPN, respectively, both in conjunction with the Primary Access system. As in FIG. 5, the terminal modem 12 provides the originate carrier prior to the completion of the telephone connection to the host modem 30. In the particular timing sequence of FIG. 7, the average time from terminal request to termination of the transaction is approximately 7.8 seconds, while in FIG. 8 the period is approximately 4.6 seconds.

The timing of FIG. 7 is developed as follows. A terminal request is initiated and the terminal modem 12 goes off hook, quickly senses the dial tone, as previously described, and rapidly tone dials the cut through sequence for the desired carrier. The required time is an average of approximately 1.4 seconds. In the case of FIG. 7, which is a delayed, MF Switched Access VPN example, the LEC 17 then communicates with the switch SWA, providing information including the ANI information. Switch SWA does its table lookup based on the ANI information and determines that this terminal 10 is set for delayed operation and so returns another dial tone to the modem 12. This process takes an average of approximately 2.4 seconds. The terminal modem 12 quickly detects this second dial tone and provides the destination number and shortly thereafter, the origination carrier. The detection and dialing process takes approximately 1.0 seconds on average. It may be that in equivalent services the entire dialed sequence can be provided in one burst, without an intervening dial tone. This would reduce the times based on the particulars of the alternate service. The switch SWA receives the destination information, performs the validation lookup as previously described and begins the call set up and ring generation process. This validation, call set up and ring generation process takes approximately 0.5 seconds. The channel unit 24 receives the ring indication. In the preferred case this is done by conventional A and B signalling elements of either loop start or E & M signalling, so that the ring detection time is almost zero, offsetting portions of the dialing time. Upon detection of the ring signal, the channel unit 24 answers the call and establishes a connection to the host modem 30 and the speed negotiation process begins. At the same time the communications processor 31 establishes a connection to the host computer. Thus the approximate time from the completion of carrier handshake by the host modem 30 until the transaction is complete is approximately 2.0 seconds. No login procedure is necessary in this case. Security is provided by the lookup and feature verification and ANI validation done by switch SWA. The destination number provided by the terminal modem 12 is an on net number, so that when the on net number is requested in this case, a validation lookup of the destination number is made to verify that the terminal modem 12, as identified by its ANI information, is a source authorized to connect to that on net number. If not, a failure indication is returned. Thus security is maintained even though the terminal modem 12 and the LEC 17 communicate over switched lines. Portion A is thus approximately 1.4 seconds, portion B is approximately 3.9 seconds, portion C is approximately 0.5 seconds and portion D is approximately 2.0 seconds.

The timing of FIG. 8 is developed as follows. Again the terminal request is initiated and the terminal modem 12 goes off hook, detects dial tone and rapid tone dials the cut through sequence. This process again takes approximately 1.4 seconds. The LEC 17 rapidly communicates with switch SWA using out-of-band signalling such as SS7, providing the ANI information and other information. The switch SWA performs its table lookup, detects the election of immediate operation and then provides the destination information to switch SWB without further contact with the terminal modem 12. No validation lookup is necessary as the immediate mode indicates that the access is authorized. Switch SWB then begins the ring generation process. This entire time from LEC 17 pickup to the end of ring generation is approximately 0.7 seconds in the average case. Again it is noted that the ring detection by the channel unit 24 is preferably done by conventional A and B signalling elements of either loop start or E & M signalling. Concurrently with this VPN feature lookup, call setup and ring generation, the terminal modem 12 will be providing the originate carrier, so that after the channel unit 24 detects the call, timing is as in FIG. 7. This case is also secure and no login procedure is required. Portion A is thus approximately 1.4 seconds, while Portion B is approximately 0.7 seconds, with Portions C and D remaining as in FIG. 7.

It is noted that timing sequences for immediate, MF Switched Access VPN and delayed, interoperable Switched Access VPN have not been provided. The Portion B times are the only ones which change, based on the different case. The two non-illustrated cases having timings between the two illustrated cases. The immediate, MF case includes the ANI information forwarding period, the switch SWA feature lookup and the call setup and ring generation. The delayed, interoperable case includes the ANI information forwarding, the return dial tone, the dialing, the second validation lookup, and the call setup and ring generation, as previously discussed.

While the above description has focused on communication of purchase or transaction information between a remote POS terminal and a central host computer center, it is understood that the techniques, embodiments and methods of the present invention can be used between any two systems which must communicate any type of information over telephone lines. Examples of the systems, which can be combined in numerous ways, include independent data networks, packet switches, local area networks (LANs) having attached modems, individual personal computers and so on. One system will be placing the call or originating the communication and thus be analogous to the remote terminal and the other system will be receiving the call or answering the request and thus be analogous to the host computer center.

The foregoing disclosure and description of the invention are illustrative and explanatory thereof, and various changes in the size, shape, materials, components, circuit elements, wiring connections and contacts, as well as in the details of the illustrated circuitry, construction, method of operation, timing, tones and protocols employed may be made without departing from the spirit of the invention.

Various embodiments of the present invention, particularly those of FIGS. 5, 7 and 8 require modifications of the modems conventionally used for communication between the host and the remote terminal. From the description set forth herein, these modifications will be obvious to those skilled in the art without departing from the scope of the invention set forth in the following claims.

I claim:

1. A method of transmitting confidential data between a particular remote modem of a plurality of remote modems and a host computer having a host modem capable of being connected to any of the plurality of remote modems, comprising the steps of:

the particular remote modem seizing a telephone line;

determining the seizure of the telephone lien by the particular remote modem and initiating a secure telephone connection sequence to the host modem, said sequence being completed only if the remote modem has been previously authorized to be connected to the host modem, said sequence being concluded by providing a ring signal to the host modem;

the host modem seizing the telephone line and providing an answer tone upon receipt of the ring signal;

the particular remote and host modems completing a baud rate determination after the answer tone is provided;

providing indication from the host modem to the host computer that communication has been established and establishing a link between the host modem and the host computer;

transmitting a transaction commence signal to the particular remote modem, said transaction commence signal being transmitted without a login procedure being performed; and transmitting confidential data between the particular remote modem and the host modem.

2. A method of claim 1, wherein the particular remote and host modems are selected to operate at fixed, common baud rates without baud rate determination handshaking.

3. A method of connecting a remote modem to a host computer having a host modem, comprising the steps of:

the remote modem seizing a telephone line;

determining the seizure of the telephone line by the remote modem and initiating a telephone connection sequence to the host modem, said sequence being completed by providing a ring signal to the host modem;

the remote modem providing an originate carrier prior to the completion of providing the ring signal to initiate a modem handshake;

the host modem sensing the ring signal and seizing the telephone line in response thereto and monitoring for the originate carrier;

the host modem providing an answer carrier after determining the presence of the originate carrier to complete the modem handshake;

providing indication from the host modem to the host computer that communication has been established and establishing a link between the host modem and the host computer; and transmitting a transaction commence signal to the remote modem after the link is established.

4. The method of claim 3, wherein the host modem provides the answer carrier without a silent interval after seizing the telephone line.

5. The method of claim 3, wherein the transaction commence signal is transmitted without a login procedure being performed.

6. The method of claim 3, wherein
if the host modem fails to determine the presence of the originate carrier within a predetermined time, the host modem provides an answer tone and the remote and host modems complete a carrier handshake, prior to providing the communication established indication.

7. The method of claim 3, wherein the ring signal is provided to the host modem only for a period sufficient to allow detection by the host modem.

* * * * *